(12) United States Patent
Wise et al.

(10) Patent No.: US 7,612,707 B2
(45) Date of Patent: Nov. 3, 2009

(54) CONFIGURABLE RADAR SENSOR

(75) Inventors: Ashley Wise, Plymouth, MN (US);
Michael Dean, St. Paul, MN (US);
Haozhe Dong, Plymouth, MN (US);
Wade D. Oberpriller, Chaska, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 265 days.

(21) Appl. No.: 11/906,121

(22) Filed: Sep. 28, 2007

(65) Prior Publication Data

US 2009/0085797 A1     Apr. 2, 2009

(51) Int. Cl.
*G01S 13/00*    (2006.01)
*G01S 13/08*    (2006.01)

(52) U.S. Cl. .................. 342/91; 342/70; 342/128
(58) Field of Classification Search ........... 342/70–72, 342/89–91, 128–130, 159, 160
See application file for complete search history.

(56) References Cited

U.S. PATENT DOCUMENTS

| | | | | |
|---|---|---|---|---|
| 4,124,848 A | * | 11/1978 | Clark et al. | 340/524 |
| 4,214,242 A | * | 7/1980 | Colin | 342/137 |
| 4,348,675 A | | 9/1982 | Senzaki et al. | |
| 4,568,938 A | | 2/1986 | Ubiaco | |
| 4,633,253 A | * | 12/1986 | Stove et al. | 342/162 |
| 5,023,618 A | | 6/1991 | Reits | |
| 5,138,567 A | * | 8/1992 | Mehrgardt | 708/304 |
| 5,229,774 A | | 7/1993 | Komatsu | |
| 5,339,081 A | | 8/1994 | Jefferis et al. | |
| 5,563,602 A | | 10/1996 | Stove | |
| 5,619,208 A | | 4/1997 | Tamatsu et al. | |
| 5,625,362 A | | 4/1997 | Richardson | |
| 5,731,778 A | | 3/1998 | Nakatani et al. | |
| 5,920,280 A | | 7/1999 | Okada et al. | |
| 5,940,024 A | | 8/1999 | Takagi et al. | |
| 5,949,366 A | * | 9/1999 | Herrmann | 342/72 |
| 5,959,570 A | * | 9/1999 | Russell | 342/70 |
| 6,037,894 A | | 3/2000 | Pfizenmaier et al. | |
| 6,072,422 A | * | 6/2000 | Yamada | 342/70 |
| 6,097,331 A | | 8/2000 | Matsugatani et al. | |
| 6,121,917 A | | 9/2000 | Yamada | |
| 6,191,726 B1 | | 2/2001 | Tullsson | |
| 6,198,426 B1 | * | 3/2001 | Tamatsu et al. | 342/70 |
| 6,317,073 B1 | * | 11/2001 | Tamatsu et al. | 342/70 |
| 6,320,531 B1 | | 11/2001 | Tamatsu | |
| 6,366,236 B1 | | 4/2002 | Farmer et al. | |

(Continued)

*Primary Examiner*—Thomas H Tarcza
*Assistant Examiner*—Peter M Bythrow
(74) *Attorney, Agent, or Firm*—Merchant & Gould P.C.

(57) ABSTRACT

Multiple signal characteristics representing an entire field of view of an FMCW (FM-CW) sensor are evaluated to determine whether the field of view has changed. Signal characteristics representing the field can be compared to representative signal characteristics obtained from previous scans. At least one signal characteristic representing at least a portion of the scene can be evaluated by comparing the signal characteristic to a dynamic threshold. The dynamic threshold can be redefined after each scan from the statistics of the signal characteristic. The dead zone of a sensor can be reduced by filtering out noise that would otherwise overshadow a signal representing the near-field region of a scene. The noise can be filtered by subtracting a polynomial curve from a time-domain signal representing the scene after fitting the polynomial curve to a representative signal generated based on previous scene scans.

23 Claims, 11 Drawing Sheets

U.S. PATENT DOCUMENTS

| | | | |
|---|---|---|---|
| 6,445,335 B1 * | 9/2002 | Tamatsu | 342/70 |
| 6,492,938 B1 | 12/2002 | Alland | |
| 6,507,311 B2 | 1/2003 | Sauer | |
| 6,563,454 B2 | 5/2003 | Akasu | |
| 6,597,308 B2 * | 7/2003 | Isaji | 342/70 |
| 6,646,589 B2 | 11/2003 | Natsume | |
| 6,664,920 B1 * | 12/2003 | Mott et al. | 342/129 |
| 6,674,393 B2 | 1/2004 | Kishida | |
| 6,753,805 B2 * | 6/2004 | Nakanishi et al. | 342/128 |
| 6,798,373 B2 | 9/2004 | Kishida | |
| 6,888,494 B2 * | 5/2005 | Tamatsu et al. | 342/128 |
| 6,999,024 B2 * | 2/2006 | Kumon et al. | 342/70 |
| 7,034,743 B2 * | 4/2006 | Nakanishi et al. | 342/128 |
| 7,071,868 B2 * | 7/2006 | Woodington et al. | 342/70 |
| 7,158,217 B2 * | 1/2007 | Hoashi et al. | 356/4.01 |
| 7,260,593 B2 * | 8/2007 | Kim | 708/304 |
| 7,463,181 B2 * | 12/2008 | Wintermantel | 342/27 |

* cited by examiner

CONFIGURABLE RADAR SENSOR

TECHNICAL FIELD

The invention relates to a radar sensor and, more particularly, to a configurable frequency modulated, continuous wave (FMCW or FM-CW) radar sensor, signal processing system, and methods for using the same.

BACKGROUND

Radar is the technique of using radio waves to detect the existence of an object and then to find the object's position in relation to a known point. Air traffic control uses radar to track planes both on the ground and in the air, and also to guide planes in for smooth landings. Police use radar to detect the speed of passing motorists. The military uses it to detect an enemy and to guide weapons. NASA uses radar to map the Earth and other planets, to track satellites and space debris, and to help with docking and maneuvering of spacecrafts.

Radar systems typically operate by emitting, for example, microwave energy from a transmitting antenna in the form of a focused beam with known divergence angles. Some of this emitted microwave energy is reflected off objects in the beam's path and collected by a receiving antenna. This emitted and reflected energy is minimally affected by environmental conditions, such as in rain, fog, clouds, or time of day.

Continuous wave (CW) is one type of radar. CW relies on the "Doppler shift" in frequency to detect moving objects and to measure their speed. This phenomenon, known as the Doppler effect, occurs with radio waves as well as with sound waves. As an object approaches a radar antenna, the frequency of the signal reflected by the object is higher than that of the transmitted signal. Conversely if an object is moving directly away from the antenna the frequency of the reflected signal is lower than that of the transmitted signal. For stationary objects there is no change in the frequency of the reflected signal.

An improvement to CW radar is frequency-modulated continuous wave (FMCW) radar. FMCW radar utilizes a frequency-modulated waveform that is continuously transmitted from and received by a radar station. In FMCW radar, the time delay between an emitted wave from a transmitter and a reflected wave from the object is calculated at a receiver. The receiver then provides an indication of the range of the object.

FMCW radar not only measures range or distance to the object, but also the object's speed. The mixed signal holds information about the distance and velocity of the object. For example, the frequency of the oscillations in the mixed signal corresponds with the distance of the object. The difference between the up-slope and the down-slope of the mixed signal corresponds to the speed of the object. The amplitude of the oscillations of the mixed signal corresponds with the relative size or quality of the reflection.

Some existing sensors report the distance and speed of an object with some degree of accuracy, but require that a known object be targeted. Other sensors use a statically determined value for the amplitude to determine whether or not an object is in view.

There exists a need in the art for improved sensor systems.

SUMMARY

In general terms, the present disclosure relates to a system and method for proximity sensing, and more particularly to a system and method for using frequency-modulated continuous wave radar to detect objects.

According to aspects, multiple signal characteristics representing the whole scene are evaluated to determine whether the scene has changed. The signal characteristics representing the scene at each scan can be compared to representative signal characteristics obtained from previous scenes.

In one example embodiment, each of the representative signal characteristics includes a rolling average of the corresponding signal characteristics of the previous scene scans.

In another example embodiment, each of the representative signal characteristics includes a median of the corresponding signal characteristics of the previous scene scans.

According to other aspects, at least one signal characteristic representing at least a portion of the scene is evaluated by comparing the signal characteristic to a dynamic threshold. The dynamic threshold can be redefined after each scan.

In certain example embodiments, the dynamic threshold has a width positioned about a center value (i.e., defines an upper and lower limit). In one example embodiment, redefining the dynamic threshold includes recalculating the center value. In another example embodiment, redefining the dynamic threshold includes adjusting the width of the dynamic threshold.

In one example embodiment, the dynamic threshold includes a noise floor that can be redefined after each scan.

According to other aspects, the dead zone of a sensor can be reduced by filtering out noise that would otherwise overshadow a signal representing the near-field region of a scene. The noise is filtered by subtracting a polynomial curve from a time-domain signal representing the scene after fitting the polynomial curve to a representative signal generated based on previous scene scans.

In one example embodiment, the polynomial curve is a second order polynomial curve.

BRIEF DESCRIPTION OF THE DRAWINGS

The invention may be more completely understood by considering the detailed description of various embodiments of the invention which follows in connection with the accompanying drawings.

Referring now to the drawings in which like reference numbers represent corresponding parts throughout.

DETAILED DESCRIPTION

Figure 1:
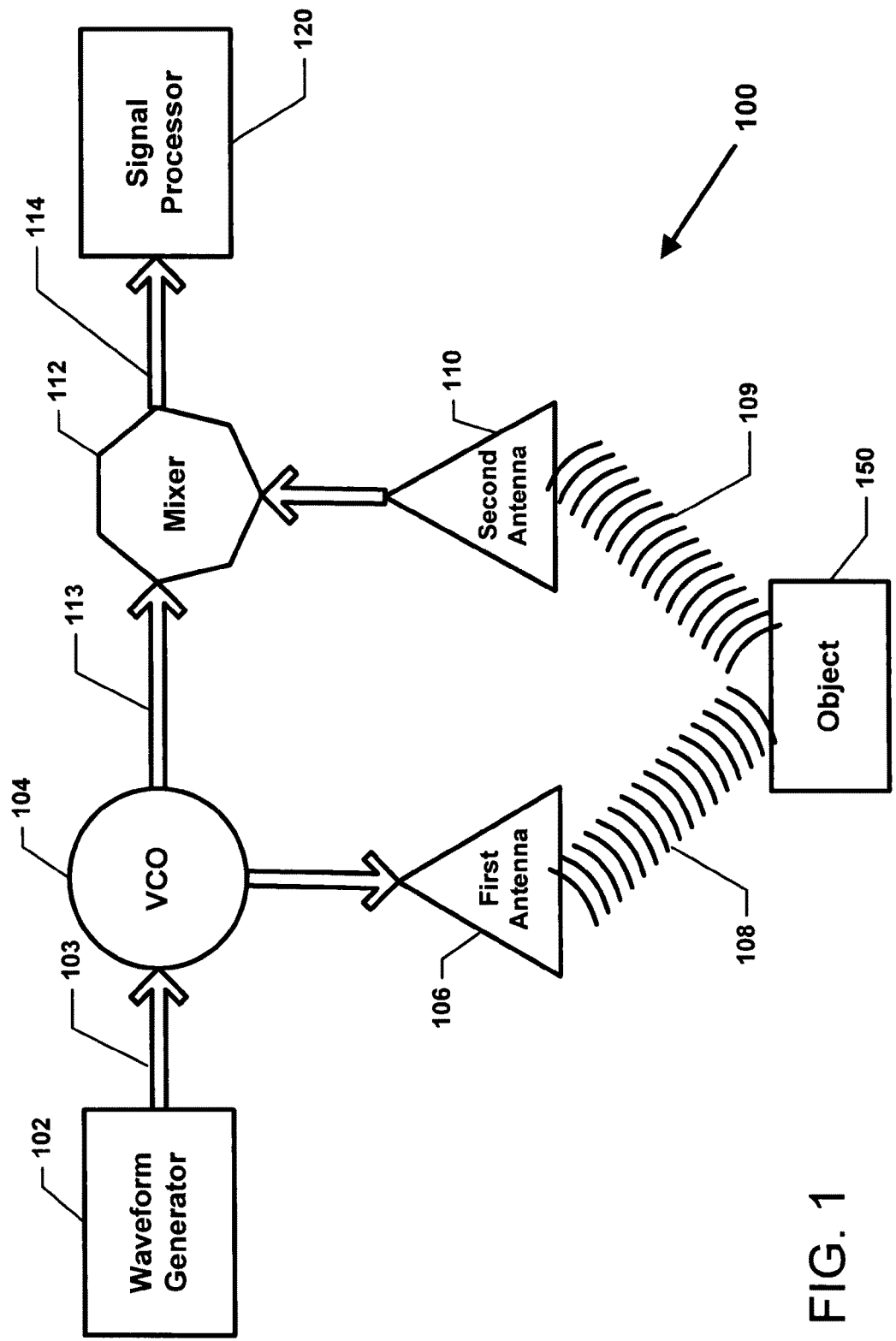
FIG. 1 is an illustration of an FMCW radar system according to one possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The disclosure relates generally to a radar sensor and, more particularly, to a configurable FMCW (FM-CW) radar sensor, signal processing system, and methods for using the same.

FIG. 1 is an illustration of an exemplary FMCW radar system 100 according to one possible embodiment of the present disclosure. The FMCW radar system 100 is configured to scan a field of view (i.e., or scene). The FMCW radar system 100 also can be configured to analyze the scans to determine whether changes in the scene have occurred (e.g., one or more objects have entered the scene, one or more objects have left the scene, one or more objects have moved within the scene, a velocity of one or more moving objects within the scene has changed, etc.).

The FMCW radar system 100 includes a first antenna 106 for emitting signals 108 and a second antenna 110 for receiving signals (e.g., reflected signals) 109. In an embodiment, a single antenna can both emit and receive signals 108, 109. The FMCW system 100 also includes a waveform generator 102 coupled to a voltage-controlled oscillator (VCO) 104 to provide a signal 113 to the first antenna 106, one or more mixers 112 for mixing the received signal 109 with the transmitted signal 113, and a signal processor 120 for processing a mixed signal 114.

The waveform generator 102 provides a periodic input signal 103, variable with an applied voltage, to a desired repeating carrier waveform of the VCO 104 to produce the signal 113. The waveform generator 102 generates the periodic input signal 103 according to a desired waveform, such as a sawtooth or triangular waveform in the KHz range. However, the embodiment is not limited to these waveforms, and any suitable waveform can be used, such as sinusoidal, square wave or the like.

The VCO 104 is subjected to this periodic waveform, which produces swept microwave emission at the transmitting antenna 106. In an embodiment, the VCO 104 is an electronic oscillator circuit whose clock frequency is determined by the magnitude of the voltage presented at its input, i.e., the frequency changes when the voltage changes. Accordingly, the VCO 104 is used to generate the signal 113, the frequency of which depends on the input voltage of the waveform generator 102.

Generally, the frequency of the signal 113 generated by the VCO 104 is in the Gigahertz range. In one possible embodiment, the frequency of the VCO 104 varies between 24 and 24.25 GHz. The frequency, or repetition per unit of time, of the VCO 104 modulated signal 113 varies in proportion to the periodic input signal 103 from the waveform generator 102. In one possible embodiment, the voltage of the periodic input signal 103 varies between 0V and 10V.

Microwave energy leaves the transmitting antenna 106 in the form of a focused beam 108 having known divergence angles, i.e., spreading out of microwave energy 108 as measured by the angle from the center axis of the emitted microwave energy 108. Some of this emitted microwave energy 108 is reflected off of an object 150 and is collected in the receive antenna 110 as a received signal 109. The object 150 can include metal structures, people, and animals. However, object 150 is not limited to these elements and can include any other structures that can reflect the transmitted signal 108, such as wood, fabric, glass, rock and the like.

The mixer 112 takes a portion of the output signal 113 and mixes it with the received signal 109 to produce a mixed (i.e., or beat) signal 114. The signal processor 120 filters, modifies, and analyzes the signal 114 to determine whether the scene has changed. Changes in the visibility of the target object 150 can indicate changes in the scene.

Figure 2:
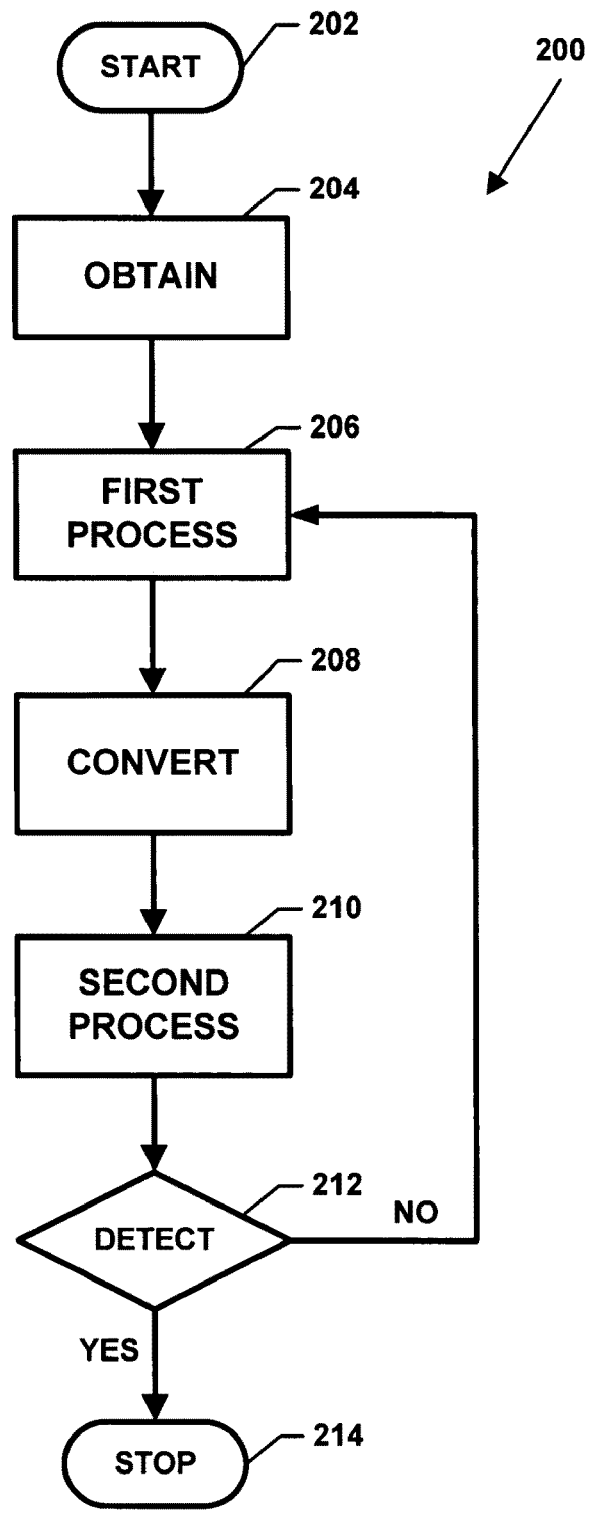
FIG. 2 is a flowchart illustrating an operational flow for an exemplary analyzing process by which the signal processor can determine whether the scene has changed in accordance with the principles of the present disclosure.

FIG. 2 is a flowchart illustrating an operational flow for an exemplary analyzing process 200 by which the signal processor 120 (i.e., or other processing or computing device) can determine whether the scene scanned in accordance with the principles of the present disclosure. The analyzing process 200 initializes and begins at a start module 202 and proceeds to an obtain operation 204, which receives the mixed signal 114 at the signal processor 120.

A first process operation 206 performs time-domain signal processing on the mixed signal 114. For example, in one embodiment, the first process operation 206 isolates a representative signal from the original pattern provided by the waveform generator 102. The first process operation 206 also can filter noise from the mixed signal 114.

A convert operation 208 transforms the time-domain mixed signal 114 into a frequency-domain signal. For example, the convert operation 208 can apply a fast-Fourier transform (FFT) to the mixed signal 114.

A second process operation 210 performs frequency-domain signal processing on the frequency-domain signal. In an embodiment, the second process operation 210 selects a sensor range within a maximum distance and a minimum distance. Distances are directly related to the frequency-domain signal by the following equation:

$$\text{Distance (m)} = \frac{\text{FFT\_Point} \times \text{AD\_Samples}}{2 \times \text{FFT\_Size}} \times \frac{c}{\text{Bandwidth}} \qquad (1)$$

wherein FFT_Point refers to a frequency bin in the Fourier transform, AD_Samples indicates the number of samples in an analog-to-digital sample, c indicates the speed of light, FFT_Size indicates the size of the Fourier transform, and Bandwidth is the bandwidth of the radar signal. In a preferred embodiment, the FFT_Size is about 512. In the U.S., the bandwidth is typically about 100 MHz and in Europe, the bandwidth is typically about 200 MHz. In addition, the second process operation 208 can filter noise from the signal using frequency-domain processing.

In certain embodiments, the second process operation 208 also can clean up the signal by compiling (e.g., averaging) the signal with other recently obtained signals to eliminate some of the noise. In one embodiment, the process operation 208 can generate a representative signal based on signals obtained within a predetermined period of time. For example, the process operation 208 can generate a representative signal based on signals obtained within a period ranging from about sixteen milliseconds to about five hundred milliseconds.

A detect module 212 determines whether or not the scene has changed. In particular, the detect operation 212 distinguishes which portions of the frequency domain signal, if any, indicate the background noise and/or background targets (e.g., target object 150 of FIG. 1) and which portions of the signal, if any, indicate changes to additional objects within the scene (e.g., presence, absence, movement, etc.).

If the detect module 212 determines no changes in scene has occurred, then the analyze process 200 loops back to the obtain operation 204 and begins again. If the detect module 212 determines the scene has changed, then the analyze process 200 completes and ends at a stop module 214. In other embodiments, the analyze process 200 can begin again after detecting a change in scene or can end even when no change in scene is detected.

Figure 3:
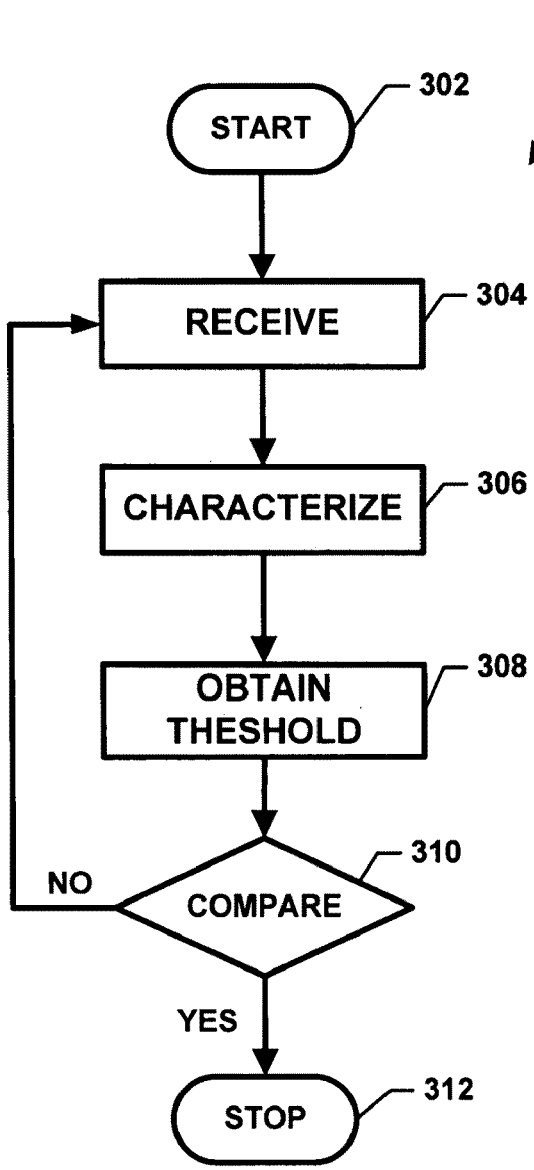
FIG. 3 is a flowchart illustrating an exemplary detecting process by which the detect operation of FIG. 2 can determine whether the field of view has changed in accordance with the principles of the present disclosure.

FIG. 3 is a flowchart illustrating an exemplary detecting process 300 by which the detect operation 212 of FIG. 2 can determine whether a change in scene has occurred. The detecting process 300 initializes and begins at a start module 302 and proceeds to a receive operation 304. The receive operation 304 obtains a processed signal (e.g., the mixed signal 114 of FIG. 1 that has been time domain processed and/or frequency domain processed).

A characterize operation 306 analyzes the received signal and identifies one or more signal characteristics (e.g., statistical values) of the received signal that characterize the scene in the field of view. Non-limiting examples of signal characteristics that can be identified by the characterize operation 306 include, inter alia, center of masses (COM), standard deviations, peak amplitudes, peak frequencies, correlations, and/or noise floors for the received signals (e.g., see FIG. 4).

An obtain operation 308 obtains predetermined threshold values for the signal characteristics associated with the expected background scene (e.g., a target object). A compare module 310 determines whether the signal characteristics of the received signal are within the threshold levels of the expected background scene. If the compare module 310 determines the signal characteristics are within threshold levels, then the detect process 300 cycles back to the receive operation 304.

In some embodiments, if the compare module 310 determines a predetermined number of the signal characteristics deviates from the threshold levels, then the detect process 300 completes and ends at a stop module 312. For example, the compare module 310 can complete and end when a single signal characteristic deviates from a threshold level. In another embodiment, the compare operation 310 only determines a change has occurred if multiple signal characteristics of the received signal deviate from the predetermined thresholds. In other embodiments, however, the compare module 310 can cycle back and repeat even when the compare module 310 determines the predetermined number of signal characteristics deviate from the threshold levels.

Figure 4:
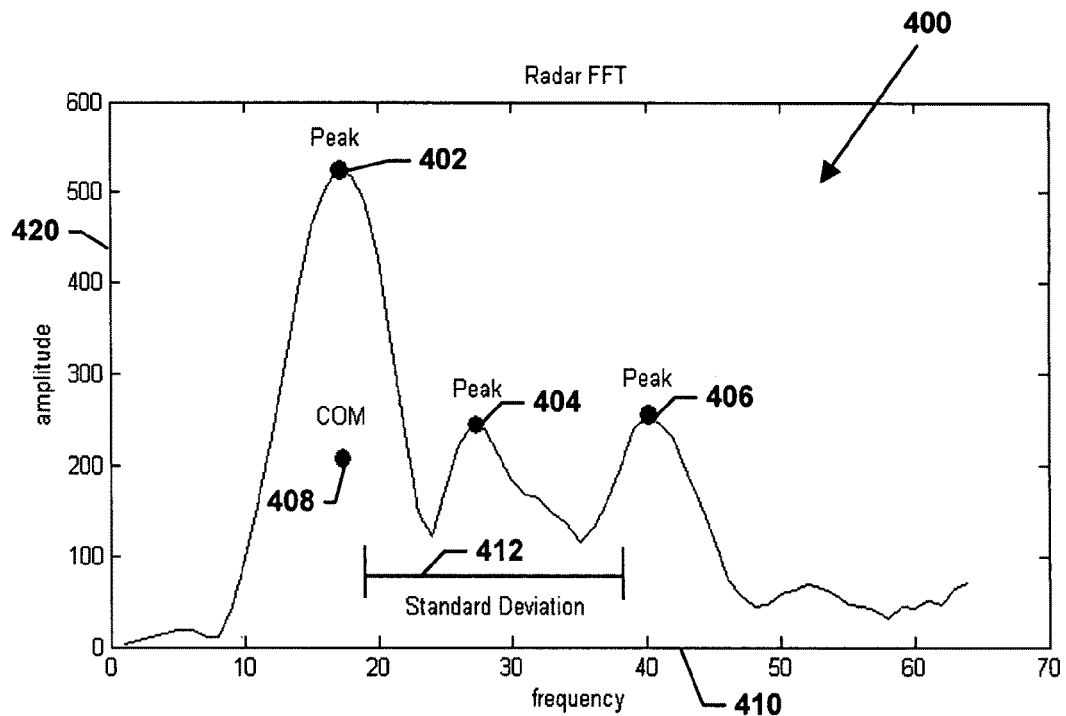
FIG. 4 illustrates a radar signal configured in a frequency-domain resulting from one possible field of view in accordance with the principles of the present disclosure.

FIG. 4 illustrates one possible field of view represented by an example mixed signal 400 configured in a frequency-domain. The signal 400 is shown plotted in a graph as a function of frequency. The horizontal axis 410 of the graph represents the frequency values of the signal 400 and the vertical axis 420 indicates the amplitude of the signal 400 at each frequency value. In the example shown, the signal 400 has a first amplitude peak 402, a second amplitude peak 404, and a third amplitude peak 406. The center of mass of the signal 400 is designated at reference number 408. The standard deviation of the signal 400 is indicated by reference number 412.

The shape and size of the mixed signal 400 generally depends on the number of target objects 150 within the scene, physical properties of the target objects 150 (e.g., dielectric properties of the object, and the size, shape, and angles of the object), and the dielectric properties of the transmission medium. The mixed signal 400 also varies depending on whether or not a signal 109 was even received at the receiving antenna 110. For example, if the transmitted signals 108 are directed out to space, no return signal 109 may be received.

Figure 5:
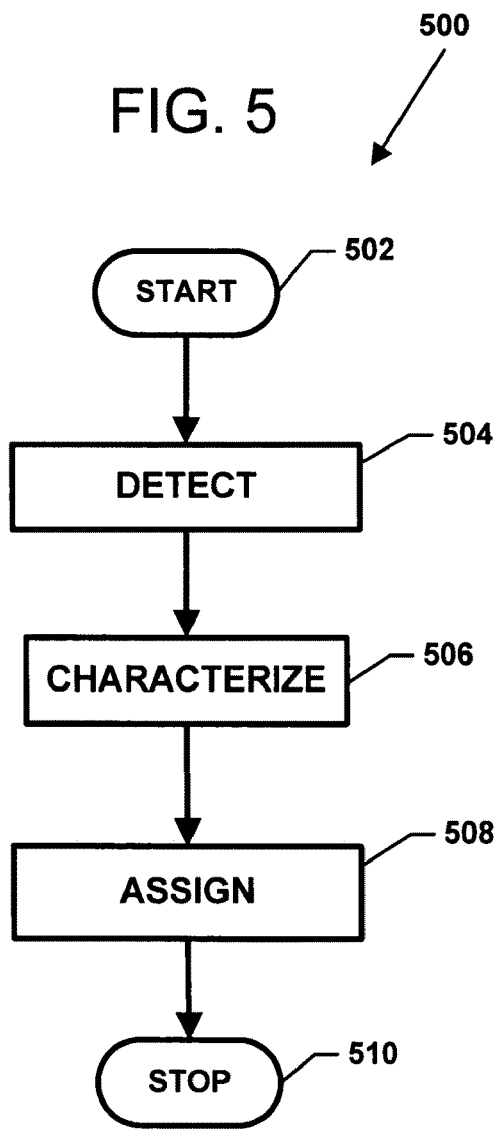
FIG. 5 is a flowchart illustrating an operational flow for an exemplary assignment process by which the threshold values can be assigned in accordance with the principles of the present disclosure.
Figure 6:
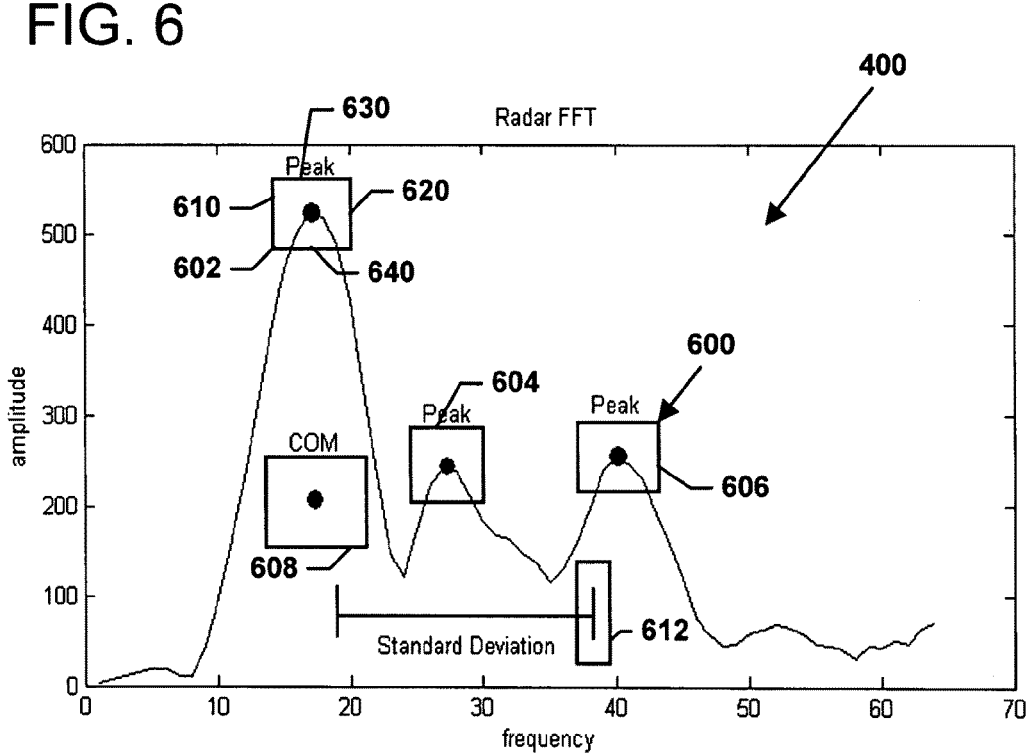
FIG. 6 illustrates exemplary threshold ranges that can be assigned to the statistical values associated with the radar signal of FIG. 4 in accordance with the principles of the present disclosure.

Referring to FIGS. 5 and 6, threshold values can be assigned to one or more signal characteristics characterizing the background (e.g., a target object). FIG. 5 is a flowchart illustrating an operational flow for an exemplary assignment process 500 by which the threshold values can be assigned. FIG. 6 illustrates exemplary threshold ranges that can be assigned to the statistical values associated with the mixed signal 400 of FIG. 4.

The assignment process 500 initializes and begins at a start module 502 and proceeds to a detect operation 504. When a radar sensor configured in accordance with the principles of the present disclosure is initialized, the detect operation 504 takes a sample reading of the background scene. In an embodiment, the detect operation 504 takes multiple readings until a reliable sampling of the background of the scene has been obtained.

A characterize operation 506 analyzes the detected signal and identifies signal characteristics of the detected signal. An assign operation 508 establishes threshold values and hysteresis values for each of the signal characteristics identified by the characterize operation 506. Typically, the assign operation 508 designates a threshold center value for each signal characteristic. In certain embodiments, the assign operation 508 can define a width of the threshold about the center value. In one embodiment, the width of the threshold can be zero (i.e., the threshold is a single value). The signal processor 120 (FIG. 1) can determine whether the scene in view of the sensor has changed by determining whether or not the received signals have signal characteristics deviating from the assigned thresholds.

For example, as shown in FIG. 6, thresholds 600 can be placed around the signal characteristics within the field of view to designate a range of values which indicate the background scene (i.e., no change of scene). In the example shown, the threshold 600 of each signal characteristic of the signal 400 is represented by a rectangular box surrounding the signal characteristic. The left side 610 and the right side 620 of each box represent thresholds on the frequency of the mixed signal 400 (i.e., the distance value). The top side 630 and the bottom side 640 of each box represent thresholds on the amplitude value of the mixed signal 400.

Deviation of the mixed signal 400 from one or more of these threshold ranges 600 can indicate a change has occurred within the field of view, such as an object entering, moving within, or leaving the field of view, or blocking the view of another object. In some embodiments, additional factors, such as correlations, the total area of the signal 400, and distortion of the signal 400, also can inform the determination as to whether the scene has changed.

In certain embodiments, a probability of scene change (i.e., the probability that the scene has changed) can be determined based on how many signal characteristics deviate from the thresholds, which signal characteristics deviate from the thresholds, a length of time over which the signal characteristics deviate from the thresholds, amounts by which the signal characteristics deviate from the thresholds, and/or the number of iterations in which such a deviation is found.

Figure 7:
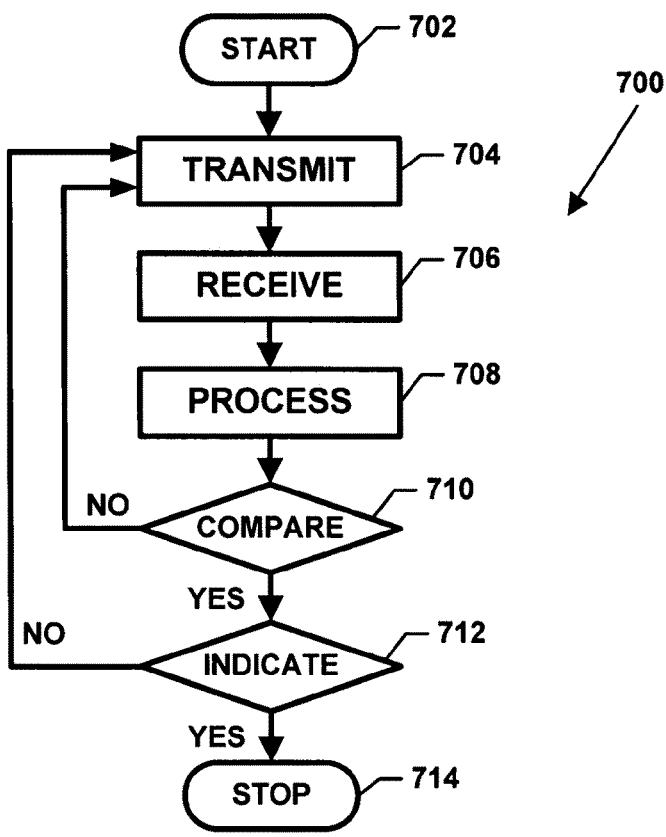
FIG. 7 is a flowchart depicting an operational flow for a detection process for determining whether a scene viewed by the sensor has changed in accordance with the principles of the present disclosure.
Figure 8:
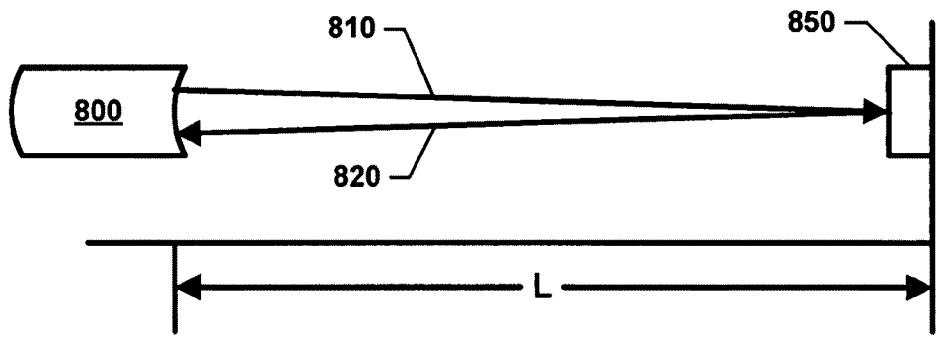
FIGS. 8 and 9 are schematic block diagrams illustrating detection signals resulting from exemplary scenes detected by the exemplary radar sensor in accordance with the principles of the present disclosure.
Figure 9:
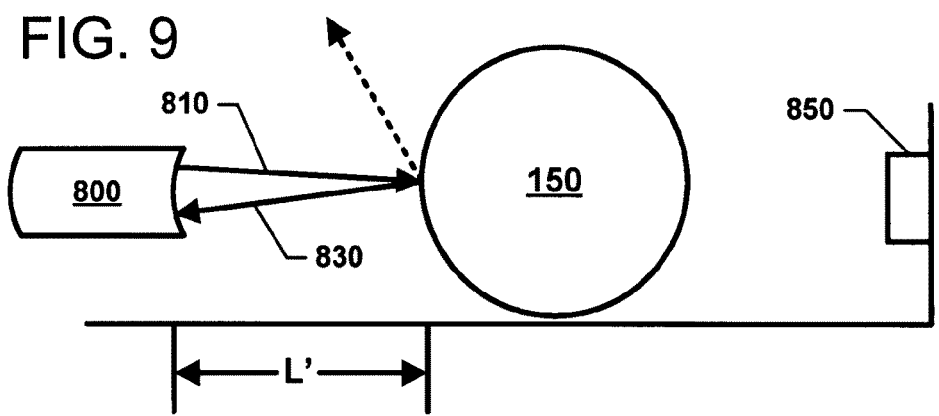

Referring to FIGS. 7-9, in use, an example radar sensor 800 can determine whether or not a scene has changed by determining whether a target object 850 is blocked from view. FIG. 7 is a flowchart depicting an operational flow for a detection process 700 for determining whether or not a scene in view of the radar sensor 800 has changed. FIGS. 8 and 9 are schematic block diagrams illustrating events detected by the exemplary radar sensor 800.

As shown in FIG. 7, the detection process 700 initializes and begins at start module 702 and proceeds to a transmit operation 704. The transmit operation 704 emits a signal, such as signal 810, from a transmitting antenna of a radar sensor, such as radar sensor 800, towards a target, such as target 850, within the field of view of the sensor.

In general, the target 850 can be reflective or non-reflective. Non-limiting examples of targets 850 include a reflective piece of material, a wall, a coated surface, and any other surface. The target 850 is located a distance L from the sensor 800. For example, the target 850 can be located a distance L of about one meter to about fifty meters away from the sensor 800. In one example embodiment, the target 850 is located a distance L of about fifteen meters away. In another example embodiment, the target 850 is located a distance L of about twenty-five meters away.

A receive operation 706 obtains signals at the receiving antenna of the radar sensor 800. If the transmitted signal 810 is not interrupted by an object, then the receive operation 706 may receive a reflection 820 of the transmitted signal 810 from the target 850. If an object is in view of the sensor 800, however, then the signal 810 will not reach the target 850. In some embodiments, the signal 810 will be reflected off the object and the reflection 830 will be received at the sensor 800. In other embodiments, the signal 810 will be absorbed or scattered by the object (as shown in dashed lines in FIG. 9) and the sensor 800 will not receive a reflected signal or will receive an only partially reflected signal.

As discussed above, a process operation 708 mixes the received signal 820, 830 with the transmitted signals 810 to obtain a mixed signal. In an example embodiment, the process operation 708 also can filter, transform, and/or clean up the mixed signal. The processed signal is compared to established threshold values at compare operation 710. If the processed signal has not deviated from the threshold ranges, for example, if the processed signal was generated from the transmitted signal 810 and the signal 820 reflected from the target 850, then the detection process 700 returns to the transmit operation 702 to start again.

If the processed signal has deviated from one or more of the threshold ranges, however, then an indicate operation 712 changes the state of the radar system 800 from a first state (e.g., a "scene unchanged" state) to a second state (e.g., a "scene changed" state). In one embodiment, the processed signal deviates when the signal received at the sensor 800 is a signal 830 reflected off an object 150. In another embodiment, the processed signal deviates from the threshold when no signal is received at the sensor 800. When a scene change is detected, the detection process 700 either can complete and end at stop module 714 or can loop back to the transmit operation 704 to begin again.

In an alternative embodiment, the target 850 is non-reflective. For example, the sensor 800 can be pointed into outer space. In such cases, the threshold values are set based on an expectation of not receiving return signals. Deviation from the threshold values will occur when the scene changes (e.g., an object 150 enters the field of view and reflects at least some signals back to the sensor 800).

In some example embodiments, thresholds values can be hard-coded into a sensor based on experimental values. For example, threshold values are typically hard-coded into static sensors, which are configured to detect the same type of objects 850 against the same type of background. Hard-coding static thresholds into a radar system places constraints on what types of scene changes will be noted by the sensor. For example, static thresholds (e.g., for range/peak and/or distance/frequency) can be assigned to limit the field of view to a distance extending from about 4 meters away from the sensor face to about 8 meters away from the sensor face.

In other embodiments, a sensor can adjust to any background by dynamically setting the thresholds values of the signal characteristics, thereby allowing the sensor to be used in multiple types of applications. As discussed in greater detail below, dynamic thresholds can change to accommodate changing backgrounds and environmental conditions affecting the sensor system. In general, dynamic thresholds are can be recalculated after a predetermined period of time, after each scan cycle, or after a predetermined number of scan cycles.

Figure 10:
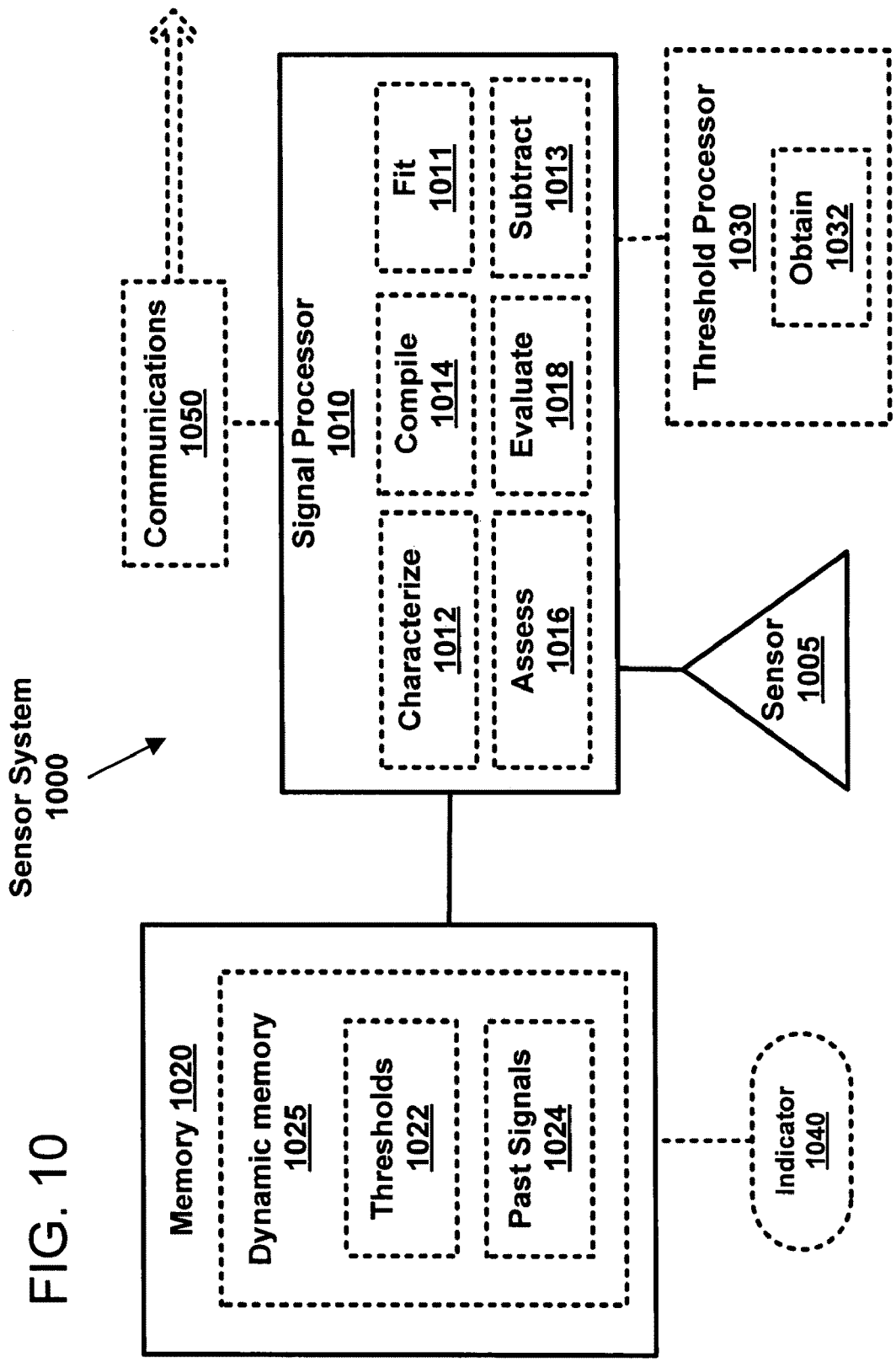
FIG. 10 is a schematic block diagram illustrating an exemplary radar sensor system configured in accordance with the principles of the present disclosure.

FIG. 10 is a schematic block diagram illustrating an exemplary radar sensor system 1000 configured in accordance with the principles of the present disclosure. In general, the exemplary radar sensor system 1000 includes a sensor 1005, a signal processor 1010, and memory 1020 communicatively coupled together. The sensor 1005 is configured to receive radar signals. In certain embodiments, the sensor 1005 also can be configured to emit radar signals. For example, the sensor 1005 can be configured to emit FMCW radar signals.

The signal processor 1010 is configured to process data obtained from the radar signals received at the sensor 1005. For example, the signal processor 1010 can determine characteristics of the radar signal (e.g., see characteristics module 1012). In another embodiment, the signal processor 1010 can include a compilation module 1014 to generate a representative signal based on previously obtained radar signals. For example, the compilation module 1014 can average together (i.e., or find a median, weighted average, etc. of) radar signals received over a period of time from iterative scans. In another embodiment, the compilation module 1014 can determine a rolling average of signal characteristics taken from multiple scans.

Embodiments of the signal processor 1010 also can include an assessment module 1016 to determine whether one or more signal characteristics of a scan deviate from assigned thresholds. The signal processor 1010 also can include an evaluation module 1018 to determine whether one or more scans of the scene deviate from a learned background. The evaluation module 1018 receives information from the assessment module 1016 indicating which of the signal characteristics deviated from their assigned thresholds.

A threshold processor 1030 of the sensor system 1000 can include a obtain module 1032 configured to determine thresholds for one or more signal characteristics. In some embodiments, the obtain module 1032 determines static thresholds for each signal characteristic. In other embodiments, however, the obtain module 1032 determines dynamic thresholds for one or more signal characteristics. In such embodiments, the obtain module 1032 recalculates the dynamic thresholds based on previous scans at predetermined intervals (e.g., after every scan).

As described in greater detail herein, the signal processor 1010 also can include near-field processing modules to shrink the dead-zone of the sensor system 1000. For example, as shown in FIG. 10, the signal processor 1010 can include a generation module 1011 configured to fit a polynomial curve to a representative signal generated by the compilation module 1014. A subtraction module 1013 subtracts the polynomial curve from a scanned signal to produce a filter signal that can be processed to detect a change in scene over a larger region than would otherwise be possible.

The memory 1020 of the sensor system 1000 is configured to store different types of data, including one or more radar signals 1024 received at the sensor 1005, signal characteristics obtained from the radar signals, assigned thresholds 1022, and/or other types of data pertaining to the sensor system 1000 and/or to the scene being scanned. In the example shown in FIG. 10, data is stored in dynamic memory 1025. In other embodiments, the data can be stored in static memory, or in a combination of static and dynamic memory.

In different embodiments, the radar sensor 1000 also can include an indicator 1040. The indicator 1040 can include a display screen on which signal data can be presented to the user. In another embodiment, the indicator 1040 can be a structure (e.g., speakers) configured to present audible indicia to a user. In other embodiments, the indicator 1040 can include light indicators (e.g., flashing lights, colored lights, etc.), measurement gauges, or other types of displays. In still other embodiments, the indicator 1040 can include a signal propagation medium (e.g., a wire) over which an indication of change of scene can be provided.

In an embodiment, the sensor system 1000 can include a communication module 1050 with which to communicate with other devices, such as a remote computing device (not shown). For example, the sensor system 1000 can be communicatively coupled to a network (e.g., an intranet, a LAN, a WAN, the Internet, etc.) in order to communicate data (e.g., the presence or absence of an object, current thresholds, current readings, etc.) to and receive data from a remote device.

Figure 11:
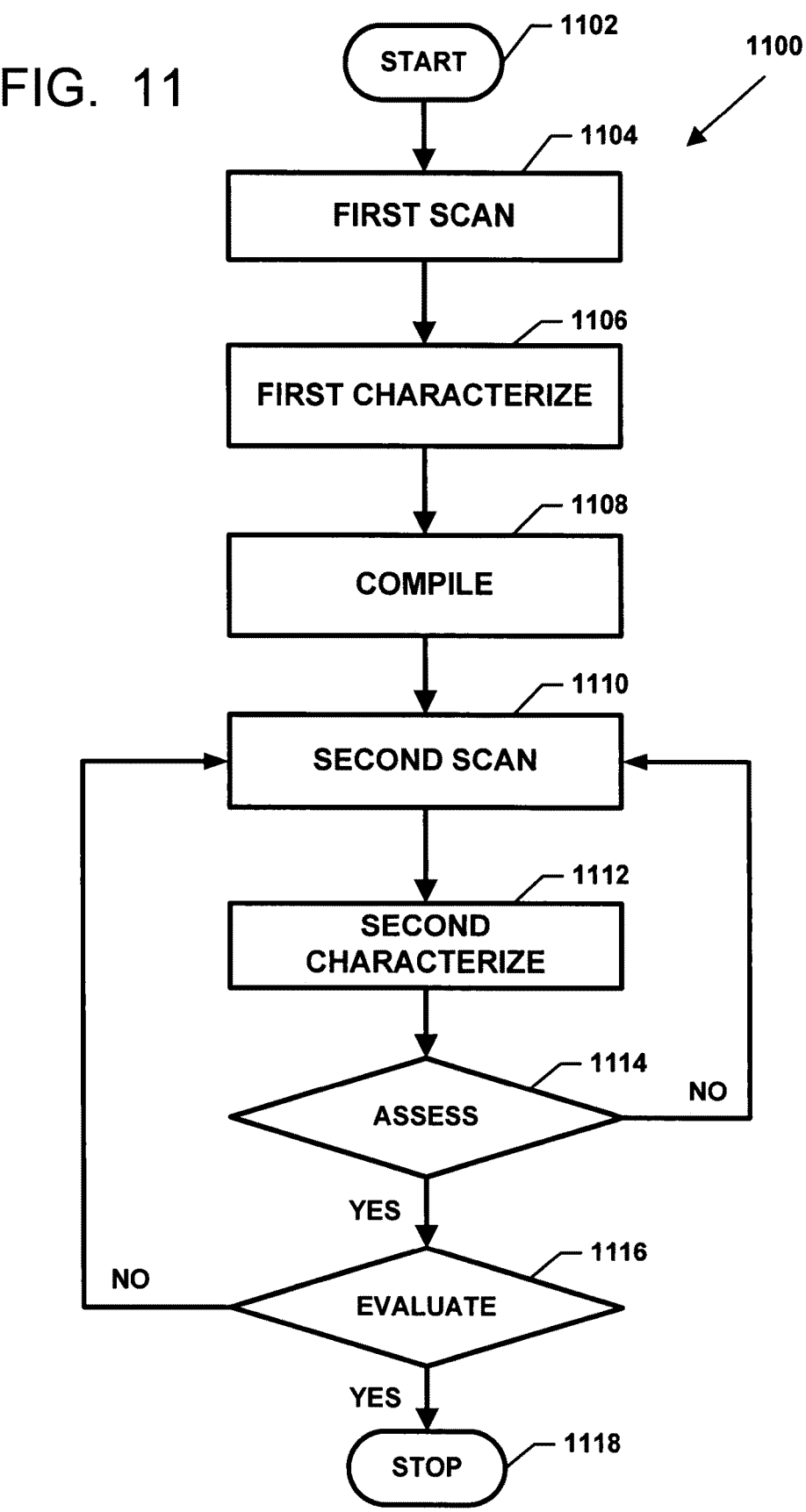
FIG. 11 illustrates a flowchart depicting an exemplary operational flow for a detection process for determining whether a scene has changed in accordance with the principles of the present disclosure.

FIG. 11 illustrates a flowchart depicting an exemplary operational flow for a detection process 1100 for determining whether a scene change has occurred within the field of view of a radar system, such as radar system 1000. In other embodiments, the detection process 1100 can be used with other types of radar systems. The detection process 1100 initializes and begins at start module 1102 and proceeds to a scan operation 1104 to determine the background of the field of view.

The scan operation 1104 receives radar signals over time at a sensor, such as sensor 1005 of FIG. 10. In some embodiments, the scan operation 1104 repeatedly takes readings of the field of view when the view is known to be clear of objects. In other embodiments, the scan operation 1104 can take readings of the field of view when target objects are known to be in view. In still other embodiments, the scan operation 1104 can take readings of the field of view both when the field is clear and when an object is present to better learn the distinctions between these views.

In some embodiments, a first antenna of the sensor emits radar signals and a second antenna receives radar signals during the scan operation 1104. In an embodiment, the same antenna transmits and receives the radar signals. In other embodiments, the radar system 1000 receives radar signals, but does not emit any radar signals.

In some embodiments, the scan operation 1104 receives radar signals for a predetermined period of time. For example, the scan operation 1104 can receive radar signals over a period of time ranging from a few milliseconds to a few hours. In one embodiment, the scan operation 1104 receives radar signals over a period of time ranging from about two milliseconds to about twenty seconds. In another embodiment, the scan operation 1104 receives radar signals over a period of time ranging from about three hundred milliseconds to about five seconds. In yet another embodiment, the scan operation 1104 receives radar signals over a period of time ranging from about twenty seconds to about four minutes.

In other embodiments, the scan operation 1104 takes a predetermined number of readings. For example, the scan operation 1104 can take a predetermined number of readings ranging from about twelve to about one hundred. In another embodiment, the scan operation 1104 can take a predetermined number of readings ranging from about seventy-five to about twelve hundred and fifty readings. Of course, the scan operation 1104 can be configured to take any desired number of readings.

A determine operation 1106 processes and analyzes the received radar signals (e.g., mixes the received signals with the emitted signals, converts the signals to different domains, filters the signals, etc.) to obtain values of one or more signal characteristics. For example, the determine operation 1106 can ascertain a center of mass for each signal and/or a standard deviation for each signal. Other non-limiting examples of signal characteristics for which values can be obtained include the number of peaks, an amplitude and/or frequency for one or more of the peaks, a noise floor, and correlations to the received signals. In one example embodiment, the determine operation 1106 ascertains multiple signal characteristics that represent the scene as a whole.

A compile operation 1108 processes the signal characteristics of the received signals to determine a representative value for each of the signal characteristics taken across sample time. For example, in one embodiment, the compile operation 1108 averages together a signal characteristic of each of the received signals to obtain an average value for the signal characteristic. In another embodiment, the compile operation 1108 finds a median value for the signal characteristic based on the received signals. In other embodiments, the compile operation 1108 can find a weighted average, a rolling average, etc. of the received signals. For example, the compile operation 1108 may average together signals taken over a period ranging from about one minute to about thirty minutes.

For example, the compile operation 1108 can determine an average frequency at which radar signals representing the scene will peak. The compile operation 1108 also can determine an average amplitude corresponding to that frequency. In another embodiment, the compile operation 1108 can find the average center of mass based on the center of mass of radar signals received over a period ranging from a few seconds to a few minutes.

A second scan operation 1110 samples (e.g., transmits and receives) one or more radar signals representing the field of view. In one example embodiment, the second scan operation 1110 samples the field of view for a period of time ranging from about two milliseconds to about five hundred milliseconds. In another embodiment, the second scan operation 1110 samples the field of view for a period of time ranging from about one minute to about thirty minutes.

A characterize operation 1112 determines signal characteristic values for the sampled radar signal obtained by the second scan operation 1110. An assessment module 1114 determines whether each of the signal characteristics of the sampled radar signal deviates from the corresponding representative value of the signal characteristic of the background radar signals. If the assessment module 1114 determines that none of the signal characteristics have deviated, then the detection process 1100 can return to the second scan operation 1110 and repeat.

If the assessment module 1114 determines at least one of the signal characteristics has deviated from the corresponding representative value, however, then an evaluate module 1116 determines whether the scene has changed based on deviation information provided by the assessment module 1114. For example, in one embodiment, the evaluate module 1116 can determine the scene has changed if a predetermined number of signal characteristics deviate from the representative value. In another embodiment, the evaluate module 1116 can determine the scene has changed if one or more signal characteristics deviate by a predetermined amount or within a predetermined period of time.

If the evaluate module 1116 determines the scene has not changed, then the detection process 1100 cycles back to the second scan operation 1110 to begin again. If the evaluate module 1116 determines the scene has changed, then the determine process 1100 completes and ends at a stop module 1118. In other embodiments, the detection process 1100 can cycle back to the second scan operation 1110 after determining the scene changed or can end even if the scene has not changed.

In another embodiment, information indicating a change of scene can be output from the sensor when the evaluate module 1116 determines the scene has changed. For example, in one embodiment, the indication can be provided via a display screen. In another embodiment, the indication can be provided via a light display. In another embodiment, the indication can be provided via audible indicia. In yet another embodiment, the indication can be stored in the memory of the sensor system (e.g., see memory 1020 of FIG. 10).

In one embodiment, the output information merely indicates the scene has changed. In another embodiment, the output information indicates that an object has entered and/or exited the scene. In another embodiment, the output information provides a distance from the sensor of a detected object. In yet another embodiment, the output information provides a velocity reading of the detected object.

Figure 12:
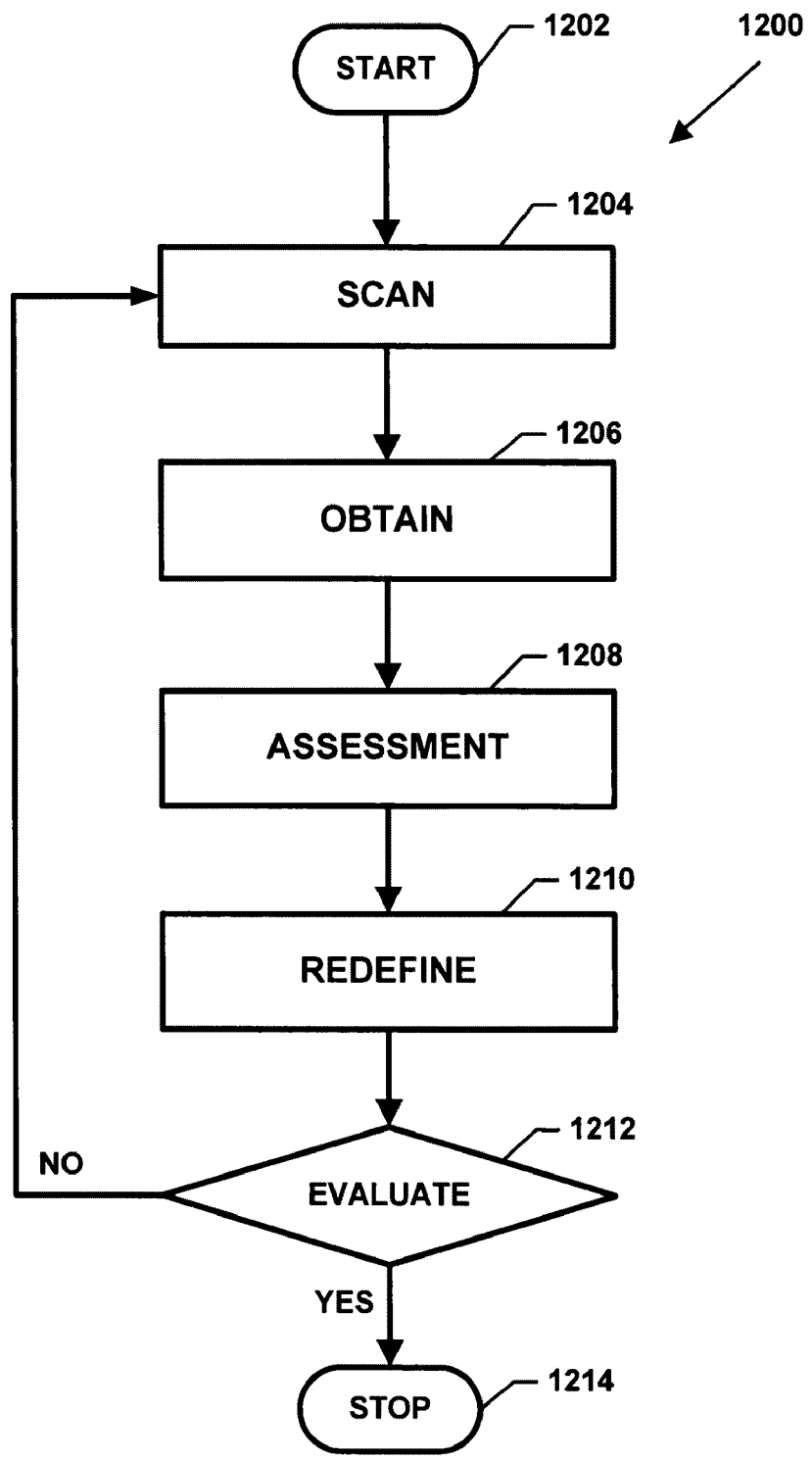
FIG. 12 illustrates a flowchart depicting an exemplary operational flow for a second detection process for determining whether a scene has changed in accordance with the principles of the present disclosure.

FIG. 12 illustrates a flowchart depicting an exemplary operational flow for a dynamic detection process 1200 for determining whether a scene change has occurred within the field of view of a radar system, such as radar system 1000. In other embodiments, the dynamic detection process 1200 can be used with other types of radar systems.

The dynamic detection process 1200 initializes and begins at start module 1202 and proceeds to a scan operation 1204 to obtain a radar signal representing the scene. In one embodiment, the scan operation 1204 is the same as the second scan operation 1110 of FIG. 11. A characterize operation 1206 determines values of signal characteristics of the radar signal representing the scanned scene. In one embodiment, the second characterize operation 1206 is the same as the characterize operation 1112 of FIG. 11.

An assessment operation 1208 determines whether any of the signal characteristics of the scanned signal deviate from one or more dynamic thresholds assigned to the signal characteristics. For example, each signal characteristic can be assigned a dynamic threshold having a range within which the signal characteristic value is expected to deviate. In one embodiment, ranges of the dynamic thresholds for each signal characteristic can be stored in memory, such as memory 1020 of FIG. 10.

A redefine operation 1210 obtains and assigns new dynamic threshold values for each signal characteristic. The redefine operation 1210 determines a dynamic threshold value for each signal characteristic based on the signal characteristic value of the most recently obtained scan. For example, the redefine operation 1210 can retrieve the signal characteristics of the most recent scan from the memory of the radar system.

The characteristics of the sampled radar signal will typically change significantly over a few seconds if an object enters, moves within, or leaves the field of view. In contrast, changes to the background (e.g., environmental changes) typically will take a few minutes, hours, or even longer to significantly affect the signal characteristics of the processed signal. Accordingly, the redefine operation 1210 also can determine the threshold value of each signal characteristic based on a history (e.g., a rolling average or mean) of signal characteristic values taken over a predetermined period of time or over a predetermined number of scans.

For example, the redefine operation 1210 can retrieve from memory recent values (e.g., taken within the last few milliseconds, seconds, minutes, or hours) of the signal characteristics. In one embodiment, the redefine operation 1210 retrieves values taken over a period of about five seconds. In another embodiment, the redefine operation 1210 retrieves values taken over a period ranging from about one minute to about one hour.

The redefine operation 1210 can process the values of each signal characteristic of recent scans to obtain a representative value from which an offset can be added to obtain a threshold. The representative signal characteristic value can include an average, a median, or similar calculation of previously obtained signals (e.g., signals representing the background). In certain embodiments, a range (i.e., threshold width) can be defined about the representative value of the signal characteristic. For example, a range of about three standard deviations (i.e., 99.73% of the data) can be defined about the representative value.

In certain embodiments, the threshold width about the representative signal characteristic value can changes based on the signal obtained in the scan operation 1204. For example, if the signal is noisy, then the standard deviation changes, thereby adjusting the threshold width. For example, if one standard deviation of a signal is about 0.1 meters, then a three standard deviation threshold is about 0.3 meters. When the signal becomes noisier, then the standard deviation increases to 0.2 meters and the threshold changes accordingly to about 0.6 meters. The redefine operation 1210 can increase the width. In one embodiment, the redefine operation 1204 does not allow the width of the threshold to decrease beyond a predetermined minimum value, which can be determined experimentally.

In an embodiment, the redefine operation 1210 stores the threshold values (see 1050 of FIG. 10) in dynamic memory 1025. In other embodiments, the threshold values can be stored in memory within a remote computing system (not shown) communicatively coupled to the sensor system 1000 via communications module 1030 (see FIG. 10).

An evaluate module 1212 determines whether the scene has changed based on information received from the assessment operation 1208. In one embodiment, the evaluate module 1212 can be the same as the evaluate module 1116 of FIG. 11. If the evaluate module 1212 determines the signal characteristic(s) of the scanned scene remain within the threshold ranges assigned to the signal characteristics (i.e., no objects were detected), then the detection process 1200 can return to the scan operation 1204. If the evaluate module 1212 determines the scene has changed, then the evaluate module completes and ends at a stop module 1214.

Optionally, the results of the evaluate module 1212 can be output (e.g., provided to the user, stored in memory, etc.). For example, the evaluate module 1212 can configure the radar system (e.g., radar system 1000 of FIG. 10) into an "scene change" state if the signal characteristics of the scanned scene deviate from the thresholds assigned to those characteristics. The evaluate module 1212 also can configure the radar system into a "scene unchanged" state if the signal characteristics of the scanned scene remain within the threshold ranges assigned to the characteristics.

By redefining the dynamic thresholds for the signal characteristics after each scan, the radar system advantageously can compensate for environmental drift occurring over a period of time. Recalculating threshold values also can compensate for the age of the sensor, which also can contribute to drift in the sensor readings over time. The threshold values of the signal characteristics are set so that the appearance of an object would likely change the signal characteristics between scans beyond the threshold(s).

However, minor changes in the scene (e.g., changes in light, temperature, humidity, and other such environmental factors over the course of the day or months of the year) generally will not change the signal characteristics enough between scans to deviate the signal characteristics from the threshold values. The dynamic thresholds drift to follow the changes in background. Optionally, the widths of the dynamic thresholds advantageously can drift to follow the amount of noise received in a signal at any given time.

Figure 13:
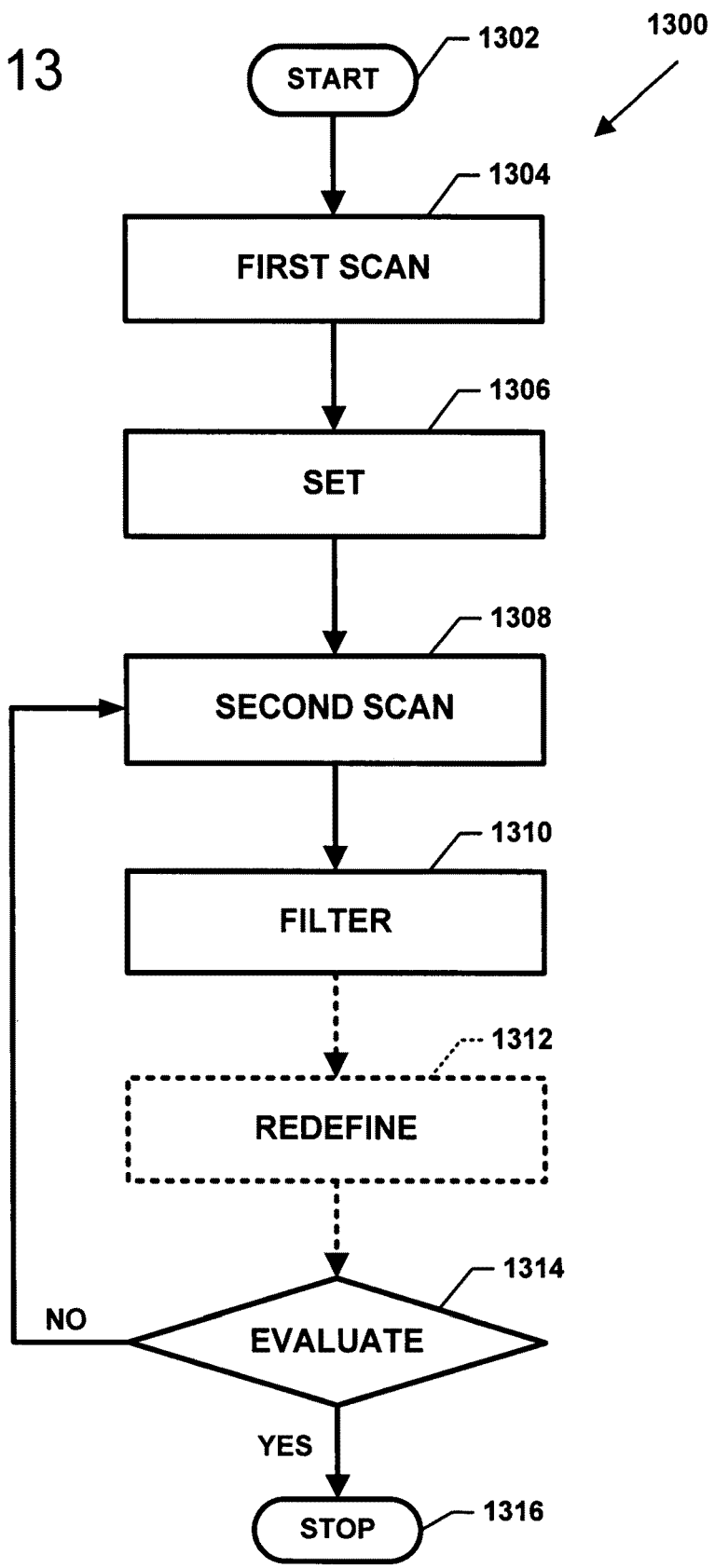
FIG. 13 illustrates a flowchart depicting an exemplary operational flow for a filtering process for filtering noise from a signal representing a field of view (i.e., or scene) of a radar system in accordance with the principles of the present disclosure.

The dynamic thresholds described above can be defined for any signal characteristic. For example, FIG. 13 illustrates a flowchart depicting an exemplary operational flow for a filtering process 1300 for filtering noise from a signal representing a field of view (i.e., or scene) of a radar system, such as radar system 1000 of FIG. 10. In other embodiments, the filter process 1300 can be used with other types of radar systems or data signals.

The filtering process 1300 generally utilizes a dynamic noise floor. In general, a noise floor is a signal amplitude threshold (i.e., in a frequency domain) at which a representative signal can be distinguished from noise. Any signal peaks having an amplitude that does not rise above the noise floor is discounted as noise. Only peaks having amplitudes above the noise floor will be processed and analyzed. The noise floor of the radar signal can vary over the cycle and/or frequency of the signal. For example, the signal can be very noisy at distances corresponding to a near-field region and less noisy at distances further out than the near-field region. The noise floor of a signal also can vary over time.

The filter process 1300 initializes and begins at a start module 1302 and proceeds to a first scan operation 1304 to learn the background of a field of view. To obtain a base noise level of the background, the first scan operation 1304 can receive one or more radar signals at sensor, such as antenna 1005 of FIG. 10, over time. In one embodiment, the first scan operation 1304 is the same as the first scan operation 1104 of FIG. 11. In other embodiments, the first scan operation 1304 otherwise obtains radar signals representing a field of view of a radar system.

A set operation 1306 assigns a noise threshold based on the scanned background signals. For example, the set operation 1306 can assign the noise threshold based on an average noise floor of the background signals. In one embodiment, the set operation 1306 can assign the noise threshold to be offset from an average noise floor by a predetermined amount. In another embodiment, the amount by which the set operation 1306 can offset the noise threshold from the average noise floor can vary. For example, in one embodiment, a user can select and/or modify a sensitivity at which the sensor will operate. Increasing the sensitivity lowers the noise threshold closer to the noise floor. Decreasing the sensitivity raises the noise threshold closer to the noise floor.

In some embodiments, the average noise floor is determined along with other average signal characteristics. For example, the average noise floor can be determined using the characterize and compile operations 1106, 1108 of FIG. 11. In other embodiments, other operations can be used to determine a representative noise floor across sample space (e.g., based on a predetermined number of samples or samples taken over a predetermined period of time). Averaging or otherwise combining the noise floors across sample space can compensate for the general instability in the level of noise that will occur over time.

A second scan operation 1308 obtains a sample radar signal after the noise threshold has been established. In one embodiment, the second scan operation 1308 can be the same as the second scan operation 1110 of FIG. 11. A filter operation 1310 cleans up the sample radar signal based on the assigned noise threshold. An optional redefine operation 1312 can recalculate the noise floor based on the background signals and on the radar signal obtained from the second scan operation. In one embodiment, the redefine operation 1312 is performed after each scan. In other embodiments, the redefine operation 1312 is performed at periodic intervals. In still other embodiments, the redefine operation 1312 is performed at any desired time.

An evaluate module 1314 determines whether or not the filtered radar signal indicates the presence of an object in the field of view. For example, the evaluate module 1314 can analyze whether signal characteristics of the radar signal obtained by the second scan operation 1308 deviate from established thresholds. In one embodiment, the evaluate module 1314 can be the same as the evaluate module 1116 of FIG. 11. The filter process 1300 can loop back to the second scan operation 1308 and begin again, or the filter process 1300 can complete and end at a stop module 1316.

Figure 14:
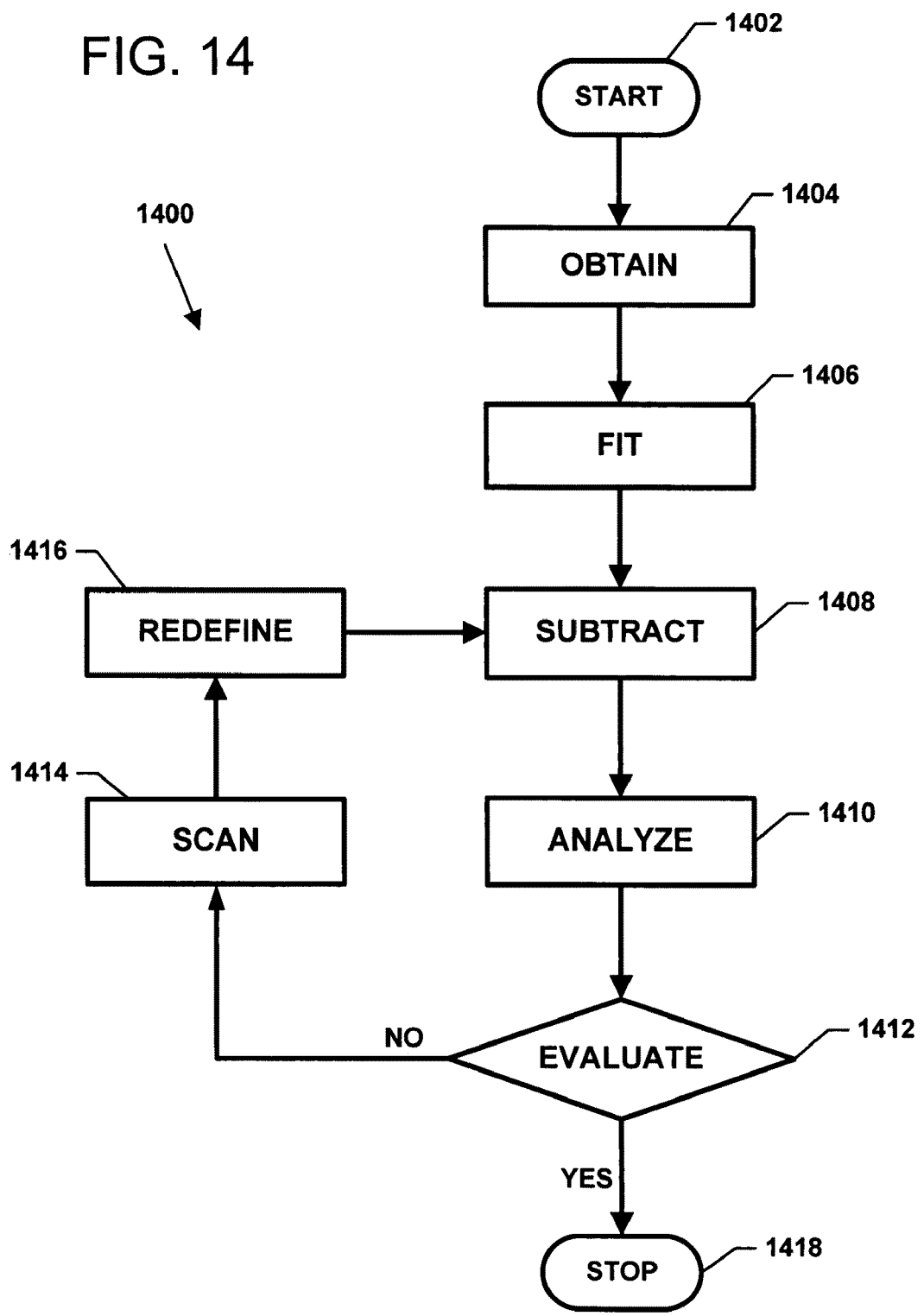
FIG. 14 illustrates a flowchart depicting an exemplary operational flow for another detecting process for detecting scene changes within the "near-field" of a field of view (i.e., or scene) of a radar system in accordance with the principles of the present disclosure.

FIG. 14 illustrates a flowchart depicting an exemplary operational flow for another detecting process 1400 for detecting whether a scene change has occurred within a region traditionally known as the "near-field" or "dead zone" of the field of view of a radar system, such as radar system 1000 of FIG. 10. In general, the near-field refers to the region immediately adjacent the radar system (e.g., the region represented by the first two cycles of the signal when configured in the time-domain). In other embodiments, the detecting process 1400 can be used with other types of radar systems.

Near field objects tend to have similar low frequency profiles to cross talk and dielectric noise. In current radar signal processing technologies, the low-frequency noise tends to dominate the signal, thereby obscuring or masking any modifications made to the signal by an object present within the near-field. Typically, any influence to the signal caused by the presence of an object in the near-field is eliminated from the signal when noise and cross-talk are filtered from the signal. Accordingly, this near-field region is traditionally known as a "dead zone."

This distance over which the dead zone extends is typically equivalent to the distance that equals two cycles of the detection signal in an analog time domain. For a 200 MHz sensor system, the dead zone includes a distance of about 2 meters from the sensor system. For a 100 MHz sensor, the dead zone extends over a distance of about 4 meters from the sensor system. In one embodiment, two cycles of a detection signal is equal to a signal frequency of about 2 KHz with a 1 millisecond sample rate. For example, an object located at a distance of about 1.6 meters from a sensor system having a bandwidth of about 190 MHz would yield a signal peak at about 2 KHz. Conventional filtering processes tend to filter out all peaks at or below the 2 KHz range.

In general, the detecting process 1400 can enable some objects present within the near-field to be detected. In one embodiment, the detecting process 1400 also can range objects in the near-field. In particular, the detection process 1400 can ascertain and distinguish some of the low-frequency noise (e.g., cross-talk, noise of the radar system itself, and dielectric effects of the radar system and atmosphere) present in the radar field of view from a signal representing a near-field object. This distinguished noise is removed before the signal is assessed for compliance with preset thresholds.

The example detecting process 1400 initializes and begins at start module 1402 and proceeds to an obtain operation 1404 to learn the background of the scene when no objects are present within the near-field region of the sensor. For example, the obtain operation 1404 can take one or more scans to obtain the background signals.

A fit operation 1406 generates a polynomial curve that fits the shape of the radar signal when the radar signal is configured in the time-domain. For example, the fit operation 1406 may generate a lower degree (e.g., quadratic) polynomial curve. In one embodiment, the fit operation 1406 can generate a polynomial curve to fit the shape of a representative signal generated based on multiple radar signals compiled (e.g., averaged) across sample-space. In one embodiment, the generated polynomial curve can be stored and/or otherwise treated as a determined signal characteristic of the radar signal as discussed above.

A subtract operation 1408 removes the background noise of the radar signal by subtracting the generated polynomial curve from the signal obtained most recently when the signal is configured in a time-domain to obtain a filtered signal. By subtracting the polynomial curve from the signal, noise can be at least partially removed from the signal without removing the representative portion of the signal.

An analyze operation 1410 processes the filtered signal (e.g., converts the filtered signal to the frequency domain) to determine whether or not the filtered signal indicates a change in scene (e.g., the presence of a new object). For example, the analyze operation 1410 can determine signal characteristics of the filtered signal and compare the signal characteristics to thresholds assigned to the respective signal characteristics.

An evaluate module 1412 determines whether a change in scene has occurred based on information from the analyze operation 1410. For example, in one embodiment, the evaluate module 1412 can be the same as the evaluate module 1116 of FIG. 11. The detecting process 1400 either can proceed to the scan operation 1414 or can complete and end at a stop module 1418. In one embodiment, the detecting process 1400 ends when a scene change is detected and cycles back when no change in scene is detected. In other embodiments, however, the detecting process 1400 may continue even after a change in scene is detected.

The scan operation 1414 obtains another sample reading of the field of view by taking another radar scan. A redefine operation 1416 generates a new polynomial curve based on the previously generated polynomial curve and the most recently obtained sample reading. Accordingly, the polynomial curve is updated to reflect changes in the noise level of the sample reading. In one embodiment, the redefine operation 1416 can compile the radar signal obtained from the scan operation 1414 with previously obtained radar signals to determine a new representative radar signal in the time domain. The redefine operation 1416 fits the new polynomial curve to the new representative signal and stores the new polynomial curve. In one embodiment, the redefine operation 1416 only stores the coefficients of the polynomial curve. After updating the polynomial curve, the detection process cycles back to the subtract operation 1408 and begins again.

A sensor configured to utilize the detecting process 1400 is able to ignore reflecting objects that are located within the field of view, but outside of the of the near-field region, when the sensor is computing the polynomial curve fit. By using a lower-order polynomial, such as a quadratic equation, only the portions of the background signal that corresponds with cross talk and dielectric noise are fitted and removed. Objects located in the field of view outside the near-field do not affect the polynomial curve and, accordingly, are not removed from a radar signal when the curve is subsequently subtracted from the radar signal.

Figure 15:
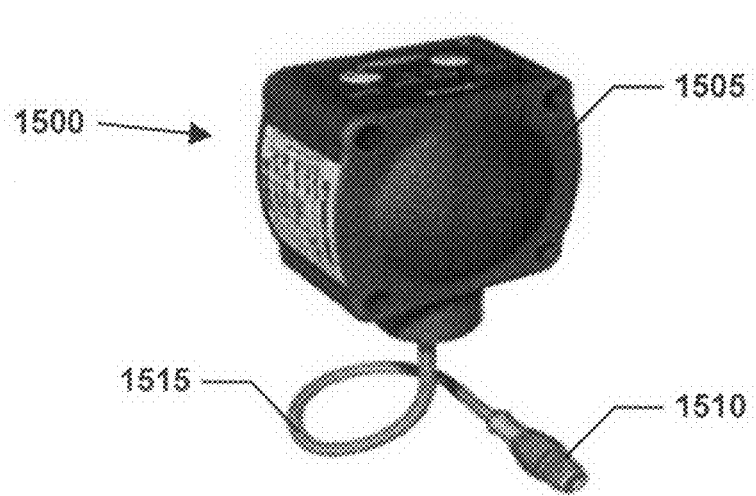
FIG. 15 illustrates one exemplary embodiment of a sensor having features that are examples of inventive aspects in accordance with the principles of the present disclosure.
Figure 16:
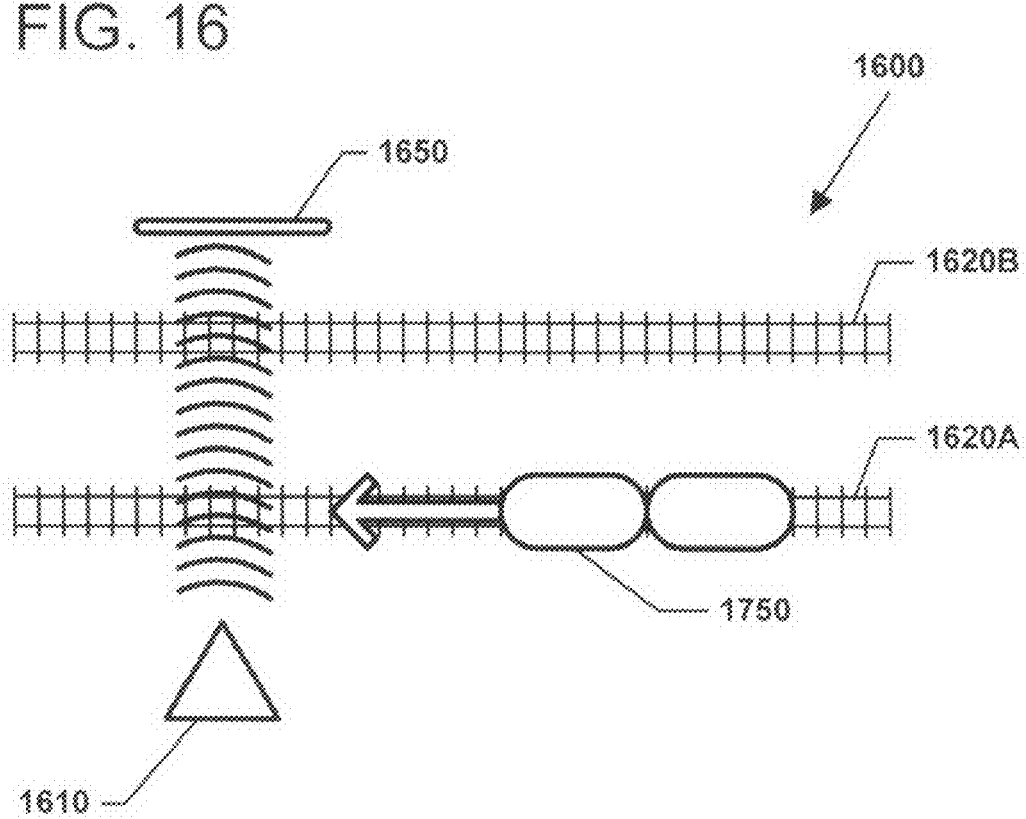
FIG. 16 illustrates an exemplary sensor used in a railroad tunnel to determine whether a train is passing by the sensor in accordance with the principles of the present disclosure.

Referring to FIGS. 15 and 16, a sensor consistent with the principles of the present disclosure could be applied in many commercial and industrial settings. FIG. 15 illustrates one exemplary embodiment of a sensor 1500 having features that are examples of inventive aspects in accordance with the principles of the present disclosure. The sensor 1500 includes a body 1505 housing transmitting and receiving antenna(s). In some embodiments, the body 1505 also can house a VCO, a waveform generator, a mixer, and/or a signal processor.

In other embodiments, the sensor 1500 is externally coupled to one or more of these devices. In the example shown, the sensor 1500 includes a connector 1510 coupled to the body 1505 with cable 1515. The connector 1510 can be configured to communicatively couple to external portions of a radar system, to a power source (not shown) for the sensor 1500, to a computing device (not shown) for processing and/or storing the received signals, or to an indicator (e.g., an audible alarm or a flashing light).

The principles of the present disclosure can best be understood through the use of an example application. FIG. 16 illustrates a sensor 1610 positioned adjacent one or more railroad tracks to determine whether a train 1750 is passing by the sensor 1610 along one of the tracks. The sensor 1610 can be mounted near the tracks and configured to transmit signals towards a target 1650 (e.g., that can be positioned adjacent an opposite side of the tracks). In the illustrated example, the sensor 1610 is configured to transmit signals to a vertical surface on the opposite side of the railroad tracks.

In certain embodiments, the sensor 1610 is mounted between zero and thirty meters from the railroad tracks. In some embodiments, the sensor 1610 can be mounted at a position such that the railroad tracks are located within the near-field region of the sensor. For example, in one embodiment, the sensor 1610 is mounted about two meters away from the railroad tracks. In other embodiments, the sensor 1610 can be mounted at any desired distance from the tracks.

In one embodiment, the sensor 1610 can determine whether a train is present on one or more tracks using the detection process 1100 of FIG. 11. The first scan operation 1104 obtains an initial sampling of the field of view when a train 1750 is absent from the tracks. In the example shown, the signals bounced off the target wall, railroad tracks, and concrete dividers 1650 and return to the sensor 1610 when the train 1750 is absent from the tunnel 1600.

The sensor 1610 processes the statistical values of the returned signals (e.g., mixes the returned signal with the original signal, converts the mixed signal to a frequency domain, etc.). Multiple statistical values (or signal characteristics) characterizing each received signal are generated at the first characterize operation 1106. In the compile operation 1108, the sensor 1610 generates a representative signal based on the returned signals. For example, the compile operation 1108 can generate representative statistical values based on the statistical values of the received signals. Threshold values can be generated based on these representative statistical values.

Next, the sensor 1610 repeatedly transmits signals and receives signals during the second scan operation 1110. The signals are processed to ascertain multiple statistical values during a second characterize operation 1112. When a first train 1750 enters the field of view of the sensor 1610 on a first set of railroad tracks 1620A, at least some of the statistical values of the processed signals will differ from the statistical values of the previously obtained background signals.

The assess and evaluation modules 1114, 1116 of the sensor 1610 ascertain these changes and determine whether these changes indicate that the target 1650 is no longer in the field of view of the sensor 1610. Accordingly, the sensor 1610 need not receive signals reflected from the train 1750 as the train passes through the tunnel 1600 to determine a train has been detected.

Furthermore, because the statistical values characterize the entire scene, the assess and evaluate modules 1114, 1116 can determine more than just whether or not the target object 1650 is in view. For example, if a second train (not shown) enters the field of view of the sensor 1610 on a second set of railroad tracks 1620B, the statistical values of the processed signals will differ from both the statistical values characterizing the background scene and the statistical values characterizing the scene including the first train 1750. Accordingly, the sensor 1610 can distinguish between a train passing by on the first track 1620A and a train passing by on the second track 1620B.

In another embodiment, the sensor 1610 can dynamically adjust its threshold settings to accommodate changes in the background of the sensor 1610, for example, using the dynamic detection process 1200 of FIG. 12. For example, if changes in the moisture content of the tunnel over time cause the target 1650 to reflect signals differently (e.g., more reflective, less reflective, scatters the signal, etc.), then the sensor 1610 can determine appropriate threshold values for the changing background.

For example, the sensor 1610 can redefine one or more of the thresholds using the redefine operation 1210 of FIG. 12. In one embodiment, the sensor 1610 compiles the signal characteristics of the most recently obtained signal with corresponding signal characteristics of previously obtained signals to obtain a representative value for each signal characteristic. The sensor 1610 than generates a new threshold for the signal characteristic based on the representative value of the signal characteristic. Dynamically redefining the thresholds can allow the sensor 1610 to distinguish between changes in moisture content of a scene 1600 and the passage of one or more trains 1750 over one or more tracks.

The sensor described herein is not limited to the example application described above. In another embodiment, the sensor 1610 can be mounted outdoors or in a railroad station. Other, non-inclusive, example applications for a sensor configured in accordance with the principles of the present disclosure include detection of cars driving on roads or parked in lots, intrusion detection by detecting objects or occlusion of objects at a particular location, proximity/collision warnings, and ranging of objects.

In an embodiment, a radar system configured in accordance with the present disclosure can be used in applications where the background is not known before installation and/or use of the system. The radar system can learn the background while in use. In another embodiment, a radar system configured in accordance with the present disclosure detects objects with general immunity to environmental changes over time. The sensor is capable of recalibrating itself to operate within the changing environment.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A detection system comprising:
   a sensor including a receiver for obtaining over a predetermined period of time a plurality of scene signals representing a scene viewed by the sensor;
   a memory communicatively coupled to the sensor, the memory configured to store a predetermined number of the scene signals; and
   a signal processor communicatively coupled to at least one selected from the group consisting of the sensor and the memory, the signal processor including:
      a signal characteristics module configured to determine a plurality of signal characteristics for each scene signal stored in the memory, each signal characteristic defining an aspect of the respective scene signal;
      a compilation module configured to determine a representative value of each signal characteristic based on the signal characteristics of the scene signals stored in the memory; and
      an assessment module configured to obtain a first scene signal from the sensor and to compare each of a plurality of signal characteristics of the first scene signal to the representative value of the respective signal characteristic to determine whether each signal characteristic has changed.

2. The detection system of claim 1, wherein the signal characteristics module is configured to determine for each scene signal at least one signal characteristic selected from the group consisting of: an amplitude of a signal peak of the scene signal, a frequency of a signal peak of the scene signal, a center of mass of the scene signal, correlations of the scene signal, and a standard deviation of the scene signal.

3. The detection system of claim 1, wherein the predetermined time is within a range from about 300 milliseconds to about 5 seconds.

4. The detection system of claim 1, wherein the predetermined number of scene signals is greater than about 75 scene signals.

5. The detection system of claim 4, wherein the predetermined number of scene signals is greater than about 1250 scene signals.

6. The detection system of claim 1, further comprising:
   a target object spaced a distance from the sensor;
   wherein the sensor further comprises a transmitter for sending a plurality of sensor signals toward the target object; and wherein the scene signals obtained at the receiver include the sensor signals that have been bounced off the target object.

7. The detection system of claim 1, further comprising an indicator coupled to the signal processor and configured to provide indicia to a user when the scene changes.

8. The detection system claim 1, wherein the first scene signal is a representative signal obtained from averaging a plurality of recently obtained signals.

9. A dynamic detector system comprising:
a radar sensor configured to scan a scene to obtain a first FMCW detection signal;
a signal processor communicatively coupled to the radar sensor, the signal processor being configured to obtain at least one signal characteristic of the first FMCW detection signal, the signal processor also being configured to compare each signal characteristic of the first FMCW detection signal to at least one dynamic threshold of the signal characteristic to ascertain changes in the scene; and
a threshold processor communicatively coupled to the signal processor, the threshold processor being configured to define the at least one dynamic threshold for each signal characteristic based on corresponding signal characteristics of a plurality of previously obtained FMCW detection signals, the threshold processor also being configured to redefine the at least one dynamic threshold of each signal characteristic after obtaining a subsequent FMCW detection signal based on the signal characteristics of the first FMCW detection signal and on the signal characteristics of the previously obtained FMCW detection signals.

10. The dynamic detector system of claim 9, wherein the threshold processor defines the at least one dynamic threshold for each signal characteristic by determining a representative value of each signal characteristic based on corresponding signal characteristics of the previously obtained FMCW detection signals, and wherein redefining the at least one dynamic threshold for each signal characteristic recalculates the representative value of each signal characteristic.

11. The dynamic detector system of claim 10, wherein the representative value of each signal characteristic is determined by taking an average of the corresponding signal characteristics of the previously obtained FMCW detection signals.

12. The dynamic detector system of claim 9, wherein the dynamic threshold of each signal characteristic has a width extending about the representative value of the signal characteristic.

13. The dynamic detector system of claim 12, wherein the width of each dynamic threshold ranges from about one standard deviation to about eight standard deviations.

14. The dynamic detector system of claim 12, wherein redefining the threshold of each signal characteristic comprises adjusting the threshold width of at least one of the signal characteristic based on a noise level of the FMCW detection signal as compared to a noise level of the previously obtained detection signals.

15. The dynamic detector system of claim 9, wherein the signal processor further comprises a noise filter module configured to define a noise floor based on noise levels of the previously obtained FMCW detection signals and configured to filter the first FMCW detection signal based on the noise floor.

16. The dynamic detector system of claim 15, wherein the noise filter module also is configured to redefine the noise floor based on noise levels of the previously obtained FMCW detection signals and the first FMCW detection signal after the evaluation module determines whether the scene has changed.

17. The dynamic detector system of claim 9, wherein the signal processor further comprises an evaluation module configured to obtain from the assessment module a determination of whether each signal characteristic has changed and to determine whether the scene has changed based on the obtained determinations.

18. The dynamic detector system of claim 9, wherein the evaluation module determines the scene has changed if the assessment module determines at least two signal characteristics have changed.

19. A signal processing system for shortening a dead zone of a sensor that scans a scene to obtain at least a first detection signal, the signal processing system comprising:
a memory configured to store at least one signal characteristic for each of a plurality of detection signals previously obtained from the sensor, wherein objects to be detected were absent from at least a near-field region of the scene when the detection signals were obtained; and
a signal processor communicatively coupled to the memory, the signal processor including:
a compilation module configured to determine a representative signal based on the detection signals that have signal characteristics stored in the memory;
a generation module configured to fit a polynomial curve to the representative signal when the representative signal is configured in a time domain;
a subtraction module configured to subtract the polynomial curve from the first detection signal obtained by the sensor when the first detection signal is configured in the time domain to obtain a filtered detection signal; and
an evaluation module configured to compare at least one signal characteristic of the filtered detection signal to a corresponding threshold of the signal characteristic to ascertain changes in the scene when the filtered detection signal is configured in a frequency domain;
whereby noise that would otherwise overshadow a signal representing the near-field region of the scene is filtered from the first detection signal before the evaluating the first detection signal to ascertain changes in the scene, thereby shortening the dead zone of the sensor.

20. The signal processing system of claim 19, wherein the signal processor further comprises:
the memory is configured to update the signal characteristics of the previously obtained detection signals to include the at least one signal characteristic of the first detection signal;
wherein the generation module of the signal processor also is configured to regenerate the polynomial curve to fit a new representative signal that represents the detection signals previously obtained by the sensor including the first detection signal.

21. The signal processing system of claim 19, wherein the compilation module processes the previously obtained detection signals to find an average of the previously obtained detection signals.

22. The signal processing system of claim 19, wherein the generation module is configured to fit a second order polynomial curve to the representative signal.

23. The signal processing system of claim 19, further comprising an indicator configured to output a signal indicating changes in the near-field region of the scene when the evaluation module ascertains the changes in the near-field region.

* * * * *